Aug. 23, 1960 J. KRITZ 2,949,772
FLOWMETER
Filed Dec. 10, 1954 7 Sheets-Sheet 1

Fig. 1.

INVENTOR.
Jack Kritz

BY *Moser, Nolte, Crews & Berry*
ATTORNEYS

Aug. 23, 1960  J. KRITZ  2,949,772
FLOWMETER

Filed Dec. 10, 1954  7 Sheets-Sheet 5

INVENTOR.
Jack Kritz

BY *Moses, Nolte, Crews & Berry*
ATTORNEYS

Aug. 23, 1960  J. KRITZ  2,949,772
FLOWMETER
Filed Dec. 10, 1954  7 Sheets-Sheet 6

INVENTOR.
Jack Kritz

BY *Moses, Nolte, Crews & Berry*
ATTORNEYS

Aug. 23, 1960

J. KRITZ 2,949,772

FLOWMETER

Filed Dec. 10, 1954

INVENTOR.
Jack Kritz

BY
ATTORNEYS

United States Patent Office 2,949,772
Patented Aug. 23, 1960

2,949,772
FLOWMETER
Jack Kritz, 64—02C 192nd St., Flushing, N.Y.
Filed Dec. 10, 1954, Ser. No. 474,403
24 Claims. (Cl. 73—194)

The present invention pertains to devices for the measurement of the flow velocity of a fluid. The invention also permits the measurement of the velocity of propagation of acoustic waves in the fluid.

The present application is a continuation-in-part of my copending application, Serial No. 67,503 filed December 27, 1948, now Patent No. 2,826,912 and abandoned applications Serial No. 209,295 filed February 3, 1951, and Serial No. 209,296 filed February 3, 1951.

By the propagation of acoustic waves traveling simultaneously in opposite directions in a fluid, it is possible to determine the flow velocity of the fluid independently of the velocity of propagation of acoustic waves therein. Similarly, it is possible to determine the velocity of propagation of acoustic waves in the fluid, independently of any component of flow velocity of the fluid in the direction of measurement.

According to the invention, there is provided a device for determining the flow velocity of a fluid which device includes transmitting means for propagating an acoustic wave in the fluid, and receiving means for the wave propagated by the transmitting means. The transmitting and receiving means are interconnected by a feedback circuit including an amplifier and a wave packet generator. Each received wave packet is amplified and triggers the generator so as to cause wave packets to be repropagated in a sustained manner. Any change in the flow velocity of the fluid will be accompanied by a corresponding change in the repetition frequency of the wave packets, and the magnitudes of the respective changes will be in constant direct ratio to the flow velocities being measured.

Flowmeters have been described in my aforesaid applications in which a modulated carrier wave is impressed on the transmitter. It is also known to impress direct current pulses on the transmitting transducer of a flowmeter. When direct current pulse type flowmeters are employed, the losses which occur in the presently available resonant acoustic transducers are so large, that the use of direct current pulses in this manner is impractical. On the other hand, when modulated carrier wave type flowmeters are employed, the following disadvantages are encountered. First, the detection process necessarily introduces a time delay, the duration and stability of which place serious limitations on the performance of the flow meter. Another disadvantage is that the present state of the art is such that components of electronic equipment having high consumption of power are required to provide the necessary amplification with reasonably short time delays.

It is an object of the present invention to provide a flowmeter of the type described above in which the feedback path between the receiver and the transmitter has a minimum and stable time delay, since the type of feedback path proposed herein does not require a detector nor a D.C. pulse generator.

It is a further object of the present invention to provide improved means for the measurement of the flow velocity and wave propagation velocity characteristics of a fluid by the utilization of pulses or packets of acoustic waves of carrier frequency, the repetition frequency of these pulses or packets varying in accordance with the magnitude of the velocity characteristic to be measured.

Still another object of the invention is the provision of a measuring device of the acoustic type which is relatively insensitive to extraneous acoustic disturbances.

A still further object is to provide a measuring device of the acoustic type in which the stability of the triggering time of the wave packet generator is very greatly increased.

A further object of the invention is to provide the feedback path between the receiver and the transmitter with a wave packet generator which produces a large signal output in response to a small trigger input; which in the absence of input trigger signals, initiates a wave packet in order to start the system; and which suppresses spurious modes of transmission by being rendered incapable of triggering for a specified and controllable time after each firing thereof.

Another object of the present invention is to provide a transducer arrangement which results in substantially equal path lengths.

Another object of the invention is to provide a transducer arrangement in which the wave paths in opposite directions through the fluid are physically close.

Another object of the invention is to increase the amount of transmitted wave energy picked up by the receiving transducers.

A further object of the invention is to improve the shape of a pulse or packet of waves transmitted by the transducers.

A further object of the invention is to improve the efficiency of supersonic frequency transducers.

A further object of the invention is to simplify the installation and improve the operation of the transducers of a flowmeter which utilizes bi-directional supersonic wave transmission through a fluid.

Other objects and advantages of the invention will be apparent from the following detailed description and the accompanying drawing, in which:

Referring to the drawing.

Figure 1:
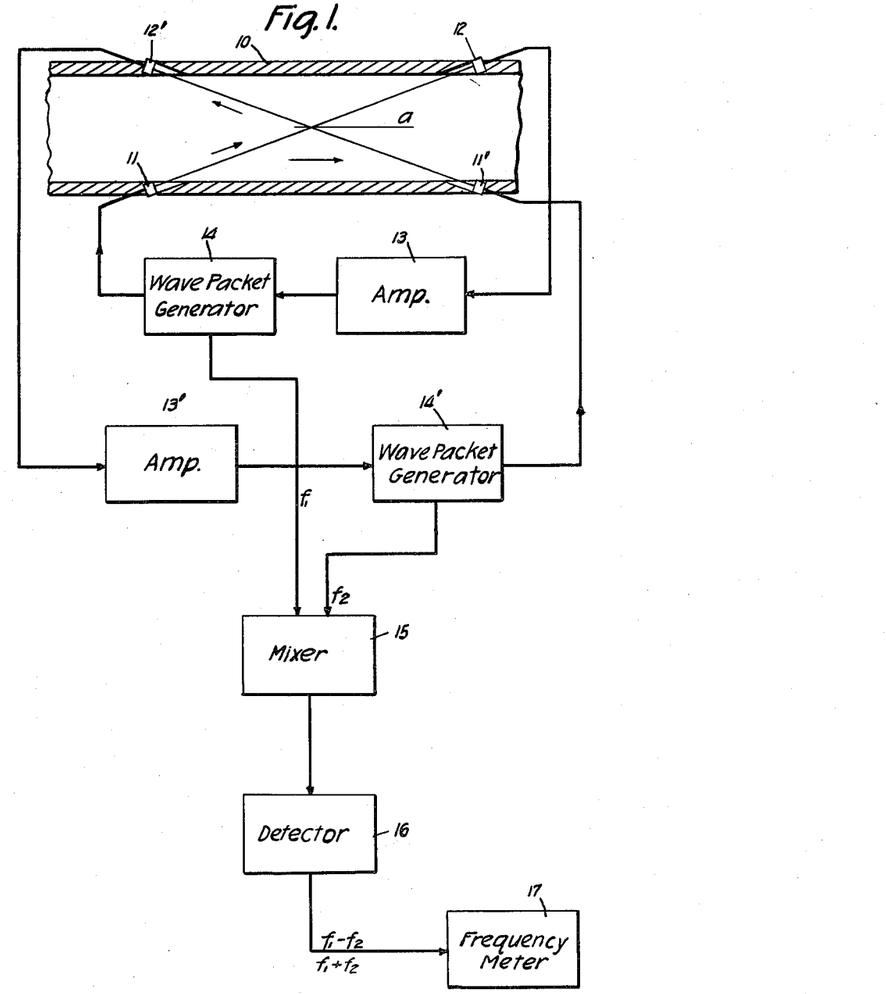
Fig. 1 is a schematic circuit diagram illustrating an embodiment of the invention.

In Fig. 1, an embodiment of the invention is illustrated utilizing four transducers mounted in a fluid conduit 10 for producing upstream and downstream transmission. The transmitting transducer 11 is arranged to transmit waves downstream to the receiver 12, while the transducer 11¹ transmits to the receiver 12¹ in the upstream direction. The waves received by transducer 12 are impressed on an amplifier 13, and the amplified waves are supplied to a wave packet generator 14, which will be described in detail hereinafter. When the amplified wave impressed on generator 14 reaches a predetermined amplitude, generator 14 is triggered and responds by producing a limited train of waves, or a wave packet. The wave packet is then impressed on transmitter 11, and after being propagated through the fluid is received by receiver 12 and transmitted through the amplifier 13 to the generator 14. Generator 14 is thereby triggered again, and in this manner repeated wave packets are produced. The transducers 11′, 12′, amplifier 13′ and wave packet generator 14′ similarly produce a continuous sequence of wave packets which travel through the fluid in the upstream direction.

Mixer 15 has its two input terminals connected to the outputs of generators 14 and 14′ respectively, and is provided with pulse signals whose repetition frequencies are $f_1$ and $f_2$, where $f_1$ is the repetition frequency of the wave packets at the generator 14 and $f_2$ is the repetition frequency of the wave packets at generator 14′. The mixed signals are fed to a detector 16 which produces in its output, signals, representing the algebraic sum of the two frequencies. The mixer-detector combination is a form of heterodyne converter or any other circuit capable of producing an output current having components of a frequency equal to the sum of $f_1$ and $f_2$ and a frequency equal to the difference between $f_1$ and $f_2$. Either of these frequency components is selected and fed to a frequency meter 17. The arithmetic difference $f_1-f_2$ is directly proportional to the flow velocity of the fluid independently of the propagation velocity of the acoustic waves therein. Similarly the arithmetic sum $f_1+f_2$ is directly proportional to the propagation velocity of the waves in the fluid independently of the velocity of flow of the fluid.

These relationships between $f_1-f_2$ and $f_1+f_2$ and the velocity characteristics of the fluid may be shown as follows:

It is obvious that the packet repetition frequency $f_1$ will be such that the period between packets equals the transit time round the loop including transducers 11 and 12. The frequency $f_1$, resulting from downstream transmission from transducer 11 to 12, therefore may be expressed as follows:

$$f_1 = \frac{Vp + x \cos a}{d}$$

where $Vp$ represents the velocity of propagation of acoustic waves in the fluid medium; $x$ represents the flow velocity of the fluid; $a$ is the angle between the direction of fluid flow and the direction of wave propagation in the fluid, and $d$ is the known distance between these two transducers.

Similarly, the repetition frequency $f_2$ in the opposite direction of upstream transmission from transducer 11′ to transducer 12′ is such that $f_2$ may be expressed as follows:

$$f_2 = \frac{Vp - x \cos a}{d}$$

At the output of detector 16 the arithmetic difference between the two frequencies may be expressed as:

$$f_1 - f_2 = \frac{2x \cos a}{d}$$

and is consequently directly proportional to the flow velocity of the fluid irrespective of any variations in the propagational velocity of the acoustic waves.

Similarly, the propagational velocity of acoustic waves may be obtained by taking the arithmetic sum of the two frequencies $$f_1 + f_2 = \frac{2Vp}{d}$$

Frequency meter 17 will give an indication directly proportional to the velocity of propagation of acoustic waves when measuring the sum of the frequencies $$f_1 + f_2$$

and will give an indication directly proportional to the flow velocity of the fluid when measuring the difference between the frequencies, $f_1-f_2$.

It will be noted that the flow velocity $x$ does not appear in the expression for the propagation velocity of acoustic waves:

$$f_1 + f_2 = \frac{2Vp}{d}$$

Likewise the propagational velocity $Vp$ does not appear in the expression for flow velocity:

$$f_1 - f_2 = \frac{2x \cos a}{d}$$

These two velocities are therefore determined each independently of the other.

Calibration of the device independent of the calculated calibration may be effected, if desired, in the following manner. At zero velocity, the frequency difference $(f_1-f_2)$ indicated by meter 17 should be zero, because the direction of transmission is immaterial at zero flow velocity. Slight differences in the lengths of the two paths, or in the characteristics of the circuit components used in the two paths may cause meter 17 to show a slight reading. This will be in the nature of a fixed residual error, however, and may be readily taken into account.

The value of the frequency difference $(f_1-f_2)$ is then observed at some different known value of flow velocity which is determined by any desired or convenient method of measurement of appropriate accuracy.

Since the relationship between $(f_1-f_2)$ and the flow velocity is linear, calibration for a range of values is readily effected.

Similarly, the device may be calibrated for the measurement of the propagation velocity of acoustic waves by reading the value of $(f_1+f_2)$ by means of frequency meter 17 for a known value of propagation velocity. Alternatively, the calibrations may be accurately calculated from the formulas given above.

Figure 2:
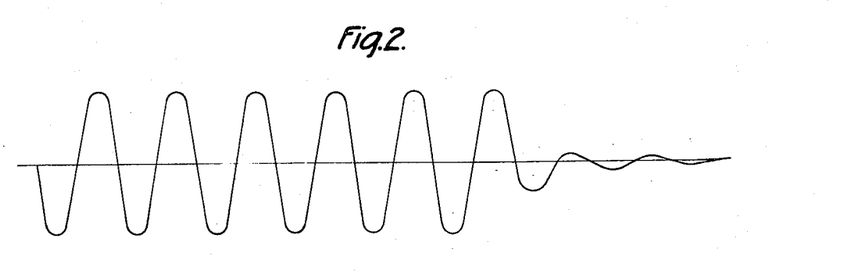
Figs. 2 and 3 illustrate the wave packets.

The triggering of the wave packet generator 14 is explained with reference to Figs. 2, 3 and 4. Generator 14 produces a short packet of high frequency oscillations at the resonant frequency of the transmitting and the receiving transducers. The wave form of such a packet is shown in Fig. 2. Due to the resonant character of the transducer and other circuit elements the signal received at generator 14 from amplifier 13 is not an exact replica of the voltage applied to the transmitting transducer 11, but rather builds up slowly in a fashion similar to that shown in Fig. 3. The wave packet generator 14 is normally quiescent and is triggered only when it receives a small predetermined voltage $E_x$. Consequently when the received voltage has built up to this predetermined voltage, as indicated at P, the generator 14 fires.

While the shape of the received wave packet and, particularly, the rate of signal buildup are functions of many variable elements, the period between successive values of the wave is a relatively stable quantity and is primarily determined by the inductive and capacitive values in the generator and by the transducer characteristics.

If the difference between the peak amplitudes of two adjacent early cycles of the wave packet impressed on the generator is made large, the instability of the firing time is confined to that ¼ cycle region immediately preceding the particular peak of the wave which is designed to effect the triggering of the generator. Some variation of the amplitude of the waves supplied to the generator may occur in the quarter cycle region mentioned above due to fluid variations or amplifier variations. Nevertheless, due to the high frequency nature of the wave packet, the total possible time variation within this ¼ cycle is small. This therefore represents a marked improvement in the time stability of the feedback loop. The manner in which the apparatus is designed so that triggering will occur within a chosen quarter cycle will be described in detail hereinafter.

Additional stability is obtained by incorporating a form of automatic volume control into the amplifiers. Fig. 4 shows a block diagram of a circuit providing automatic volume control for an amplifier 13a in order to stabilize the output thereof. The output of amplifier 13a and a fixed reference potential are fed to a voltage comparator circuit 23. The output of comparator circuit 23 is impressed on the gain control elements of the amplifier so as to maintain its output at a level determined by the reference potential, and to remove fluctuations which may be caused by impurities in the fluid or by other factors. It will be understood that Fig. 4 illustrates only one feedback circuit of the complete flowmeter circuit shown in Fig. 1.

Figure 5:
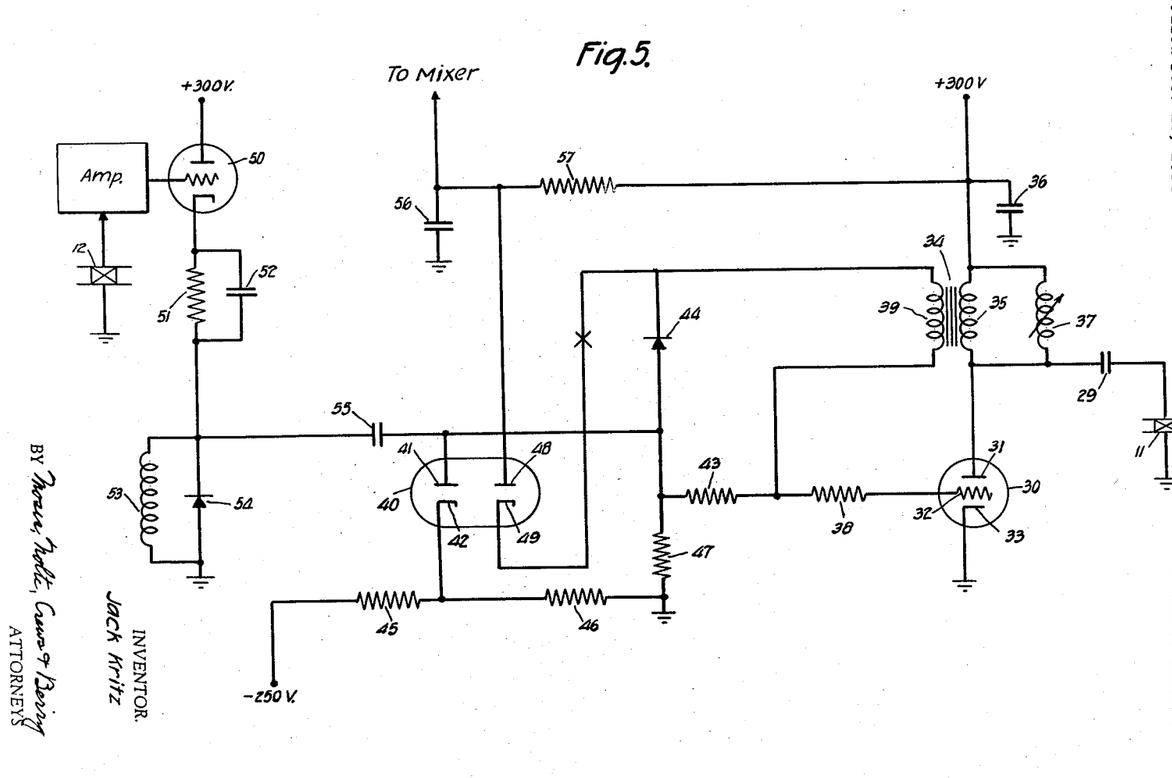
Fig. 5 is a circuit diagram showing the connections of the wave packet generator.

In Fig. 5 is illustrated the circuit of one type of wave packet generator adapted for use in the flowmeter of the invention. A triode 30, which may include both sections of a dual triode tube, such as the type 5670, has its anode 31 connected through a condenser 29 to the transmitting transducer 11. Cathode 33 of tube 30 is grounded. Anode 31 is also connected through a winding 35 of transformer 34 to a terminal of a source of voltage of +300 v. A filter condenser 36 is also connected to the positive voltage terminal. The winding 35 and the transducer capacitance is tuned by a variable inductor 37 to the resonant frequency of crystal 11. It is evident that tube 30 is connected as a blocking oscillator and transformer 34 is of the type used for blocking oscillators, and is characterized by low leakage reactance, low shunt capacity and a high coupling coefficient. The secondary winding 39 is connected at one end through a resistor 38 to the grid 32 of tube 30 and polarity of winding 39 is such as to produce regeneration. The resistor 38 is merely a current limiting resistor for protecting grid 32. A bias of, for example, 8 volts is applied to grid 32 through diode 41—42 section of tube 40. The cathode of 42 is suitably biased from a source of 250 v. connected across a voltage divider 45—46. Thus the voltage on cathode 42 is supplied through the diode 41—42 and resistors 43 and 38 to the grid 32. Under this biasing condition tube 30 is conducting in a high transconductance state, but it will not regenerate or oscillate in the absence of sufficient excitation because the return side of winding 39 is effectively open circuited by the diode 44. For the time being consider that the lead connected to the diode cathode 49 is open circuited at the point marked x. The tube 30 will then remain in a quiescient state.

The amplifier 13 has its input connected to the receiving crystal 12 and its output connected to the grid of a cathode follower 50 having a biasing circuit 51, 52 and a load circuit consisting of an inductance 53 and a diode 54. If a pulse, or any form of a varying potential is applied to the load circuit 53, 54, the negative voltage swing would be short circuited by the diode 54. When a voltage of positive polarity is impressed on diode 54, this voltage is transmitted through condenser 55 and resistors 43 and 38 to the grid of tube 30. The positive voltage on grid 32 causes an increase of plate current which produces an amplified positive voltage on the grid side of winding 39. This voltage however is not applied directly between the grid and cathode of tube 30 since the diode 44 is open circuited. If the positive voltage swing is of sufficient magnitude the amplified voltage across winding 39 may exceed the bias across the resistor 47. When this happens the grid cathode circuit of tube 30 becomes conductive, diode 44 also conducts, and the voltage across winding 39 is applied to the grid-cathode circuit of tube 30. Regeneration then takes place and causes the plate current of tube 30 to rise rapidly. The circuit formed by windings 35 and 37 resonates with the capacitance of transducer 11 and causes oscillations to be produced across winding 39. During each positive peak of these oscillations grid current flows through the grid cathode circuit of tube 30, diode 44, condenser 55 and diode 54. At each such peak condenser 55 receives an additional charge and produces an increased negative potential on its side toward grid 32. After a certain time, condenser 55 impresses a sufficiently high negative potential on grid 32 to cut off tube 30 and stop the oscillations. The voltage of plate 31, and therefore the crystal voltage, has the appearance of Fig. 2.

Figure 6:
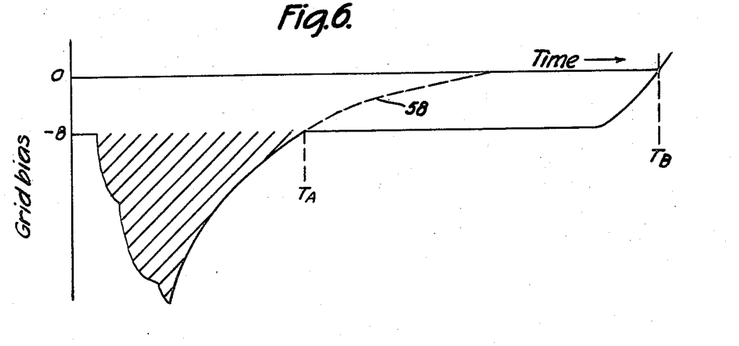
Fig. 6 is a diagram illustrating the operation of the wave packet generator.

At the moment the oscillations stop, the bias on tube 30 is high and represents the accumulated charge on condenser 55. The anode 41 of tube 40 is now negative with respect to cathode 42, so that this diode does not conduct. Condenser 55 begins to discharge through resistor 47 and inductance 53, and the bias on grid 31 begins to decay as shown in Fig. 6. When the voltage across condenser 55 becomes the same as cathode 42, which is 8 volts, diode 41—42 begins to conduct and sharply maintains this potential. The dotted line 58, of Fig. 6 is the discharge curve that would be followed if diode 41—42 did not begin to operate. In the shaded area of Fig. 6 any triggering pulse of normal magnitude would be ineffective in starting oscillations, since the bias on grid 32 is then excessive. Thus the oscillating circuit of tube 30 is immobilized until time $T_a$ determined by the time constant of condenser 55 and resistance 47, and this provides a mode suppression characteristic, preventing tube 30 from firing at a higher, spurious rate.

Under ordinary conditions the bias voltage of —8 volts on grid 32 would remain indefinitely, and no new oscillation would occur until another trigger wave was delivered through the cathode follower 50. If the lead of cathode 49 is now considered as not broken at the point x, as previously assumed, condenser 56, which also has been charged by the grid current, would then produce the following result. The time constant of condenser 56 and resistor 57 is much longer than that of condenser 55 and resistor 47, so that shortly after oscillation is initiated diode anode 48 is negative with respect to cathode 49 and there is no conduction therebetween. Thus, effectively, condenser 56 and resistor 57 are disconnected from the remainder of the circuit. If a sufficient time elapses without the occurrence of oscillations, condenser 56 becomes positively charged to a voltage exceeding the grid bias. Diode 48, 49 then conducts and the potential of grid 32 begins to rise again, eventually causing oscillations to start again and a wave packet to be produced at time $T_b$ of Fig. 6. The timing of this action is controlled by the time constant of condenser 56 and resistor 57, which time constant is adjusted to be much longer than any possible transit time around the complete loop. The self starting feature just described automatically comes into operation if there is any interruption in acoustic transmission, as well as when the instrument is initially turned on. Diode 48, 49 rectifies the negative half cycles of the oscillations impressed thereon by winding 39 and supplies current to condenser 56. The voltage produced across condenser 56 is a convenient place for obtaining a D.C. pulse signal output whose repetition rate is that of the wave packet generator.

Fig. 1 illustrates a form of the invention in which waves are transmitted through the fluid in opposite direction along two separate paths. The paths may be separated by suitable means such as disclosed in my aforementioned application, Serial No. 67,503, now Patent No. 2,826,912. Also, as shown in said application, the bi-directional transmission may be accomplished with a single pair of transducers, or the velocity characteristics may be determined, albeit not separately, by transmission through the fluid in only one direction.

In a wave packet flowmeter, the received vibrations build up to their maximum value at a rate determined by the amount of mechanical loading presented to the crystal transducers. It is desirable, however, that the particular cycle of the wave packet chosen for triggering the wave packet generator have an amplitude considerably higher than the cycle immediately preceding it. This condition is desired in order to prevent firing at the wrong cycle. It is also desirable that the magnitude of succeeding cycles not be considerably higher than the chosen firing cycle so as to preclude interference in operation from random reflections.

Figure 3:
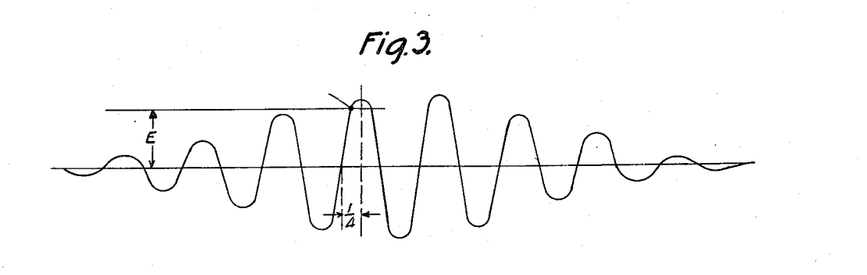
Figure 4:
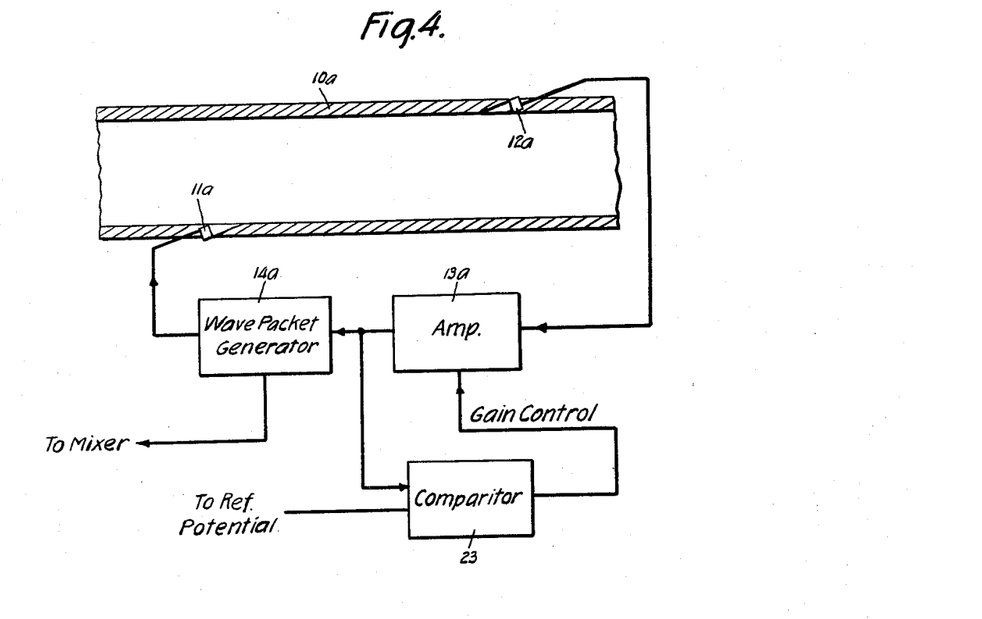
Fig. 4 is a block diagram showing a modification of the feedback path in which the amplifier is provided with automatic volume control.

It has been found when using resonant piezoelectric crystals as transducers in direct contact with the fluid to be measured, that the wave packet buildup time is slow, while its eventual maximum amplitude is high, as shown in Fig. 3. In using such crystals, a relatively early cycle must be used to take advantage of a relatively large difference in amplitude between successive cycles.

Figure 7:
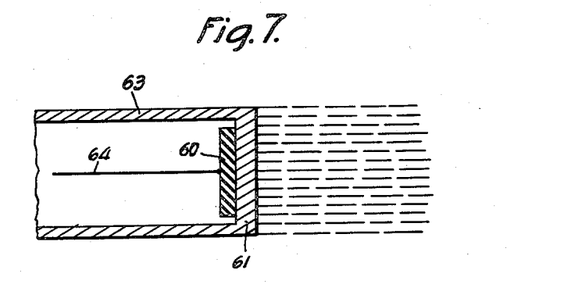
Fig. 7 is a partial sectional view of an improved transducer.
Figure 8:
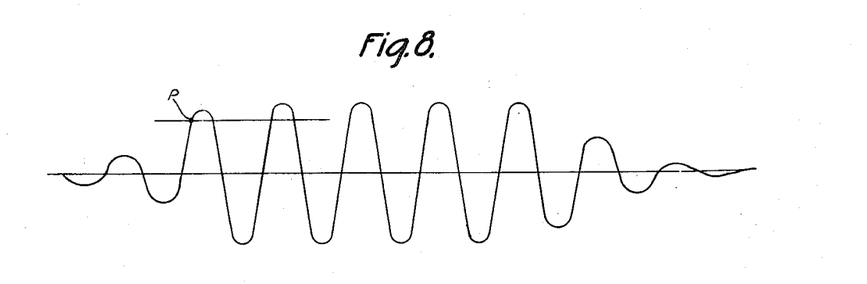
Fig. 8 is a diagram of a wave packet of improved form.

A transducer for producing a wave packet having an improved wave form is illustrated in Fig. 7. The piezoelectric crystal 60 having a connection 64 is provided with a metal member 61 between it and the fluid. Member 61 may be provided by a cylindrical housing 63, as shown in Fig. 7. The high acoustic impedance of such a housing loads the crystal heavily and produces the desired characteristics described above. The overall loss to the early cycles of a crystal with such a member is no higher than when the crystal is in direct contact with the fluid, due to the increased power absorbed from the crystal by the high acoustic impedance loading. In fact, a material may be chosen for the member which gives a gain for the early cycles over that obtained by direct contact between the crystal and the fluid. The crystal may be mounted on the member 61 in any manner which assures an intimate contact therebetween. One method is to provide a pressure mounting with a thin film of coupling fluid between the crystal and the member. Another is to provide a thin film of solid adhesive between the surfaces. The housing 63 separates the crystal from the fluid and has the important advantage of providing chemical and mechanical protection for the crystal. The improvement given by the metal member is shown qualitatively by Fig. 8, in comparison with Fig. 3. In Fig. 8 the second positive half cycle has a much greater amplitude than the first positive half cycle and thereafter the amplitude of the wave packet remains nearly constant.

When the thickness of the member 61 is greater than half the number of wavelengths of the wave packet in member 61, reflections from the metal-fluid boundary arrive back at the crystal when excitation is no longer present, and the thickness no longer contributes to the amplitude of the early cycle behavior. Thus thick metal slabs can be used without altering the performance. In certain instances, however, it is desirable to control the thickness of member 61 to a specified value less than half the length in member 61 of the number of waves produced by the wave packet generator. For example, a plate having a thickness of a half wavelength will cause the second cycle of the wave packet to be reinforced and give a further improvement, or conversely, a plate having a thickness of three quarters wavelength will tend to reduce the amplitude after one and a half cycles thus reducing reflection effects.

Figure 9:
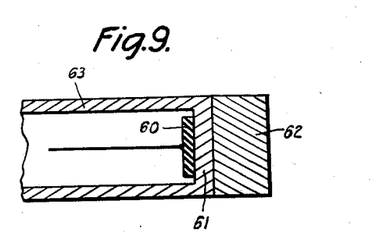
Fig. 9 is a partial sectional view of another transducer according to the invention.

In Fig. 9 a material 62 having an appropriate acoustic impedance is fastened to the metal member 61. The material 62 has an acoustic impedance preferably lying between that of the fluid to be measured and that of metal housing 63, in order to permit increased power transfer. When an additional layer such as 62 is desired for chemical protection of a more suitable crystal loading material, a layer having a very high acoustic impedance can be used if the layer is extremely thin, or if it is an integral number of half waves thick but less than half the length of a wave packet.

In previous flowmeters using two wave paths, crossed diagonal paths for acoustic transmission have been suggested, as shown in Fig. 1. Such an arrangement has these disadvantages: (1) great machining accuracy is required to insure equal path lengths; and (2) the paths are physically remote from each other so that even slight differences in the state of the fluid in the different paths cause slightly different propagation velocities which result in large errors in flow measurement, especially at low flow velocities. My prior applications, of which this application is a continuation-in-part, disclose hybrid and bridge methods which overcome the above noted objections. I shall now describe another means of overcoming these objections which approaches the characteristics of the hybrid method but does not require accurately balanced bridge or hybrid circuits.

In the transducer assembly shown in Figs. 10 and 11, the metallic cylindrical housing 63a has an end wall 61a which may be dimensioned as described in connection with Fig. 7, and may contact the fluid directly or through an impedance matching section such as the material 62 in Fig. 9. Within the housing 63a and on the wall 61a a pair of crystals 65, 66 are mounted. One of these crystals serves as a transmitter and the other serves as a receiver. The crystals are provided with leads 67 and 68. The crystals may be semi-circular, although it will be understood that other crystal shapes can be used. Under certain conditions when the thickness of metal wall 61a is large, acoustic coupling between the crystals occurs. Such unwanted coupling is reduced by a diametrical notch 69 cut in the metal interface 61a so as to separate the two active halves of interface 61a. An electrical shield 70 prevents electrical coupling between the two crystals.

Figure 10:
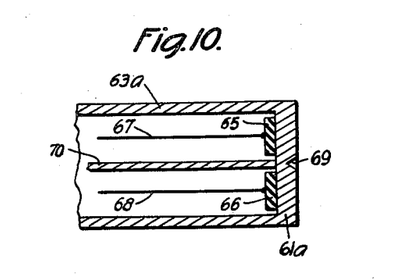
Figs. 10 and 11 are views of a dual transducer.
Figure 11:
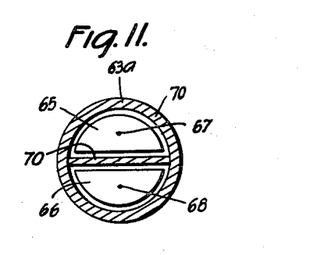
Figure 12:
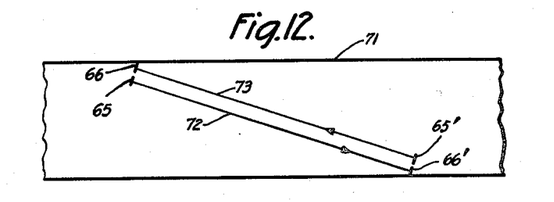
Fig. 12 illustrates an arrangement of dual transducers such as shown in Figs. 10 and 11.

The dual transducer shown in Figs. 10 and 11 not only has the advantages of the transducer shown in Fig. 7, but has the further important advantages in that it greatly simplifies the obtention of substantially equal and close travel paths for the waves in the fluid. The manner in which these advantages are obtained is illustrated in Fig. 12. One dual transducer of the type shown in Figs. 10 and 11 is positioned on one side of the fluid conduit 71 and a similar dual transducer is positioned in spaced relation to the first transducer device on the opposite side of the fluid conduit. The crystals 65 and 65' are transmitters and crystals 66 and 66' are receivers. The crystals in the two transducing devices are arranged to give two close and parallel paths 72, 73. Moreover, the lengths of the paths can be readily equalized with far greater accuracy than can be generally obtained by the use of four separate transducers arranged as shown in Fig. 1 for example. To make the paths equal in length all that is necessary is to make the end walls of the transducer housings parallel.

Figure 13:
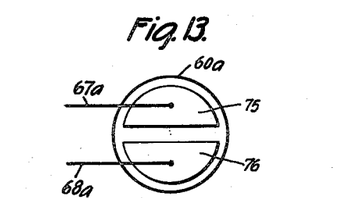
Fig. 13 is an end view of another crystal arrangement for a dual transducer.

Instead of using two separate crystals to form a dual transducer a single crystal slab 60a may be used, as shown in Fig. 13. On the slab 60a there are mounted two separate electrodes 75 and 76, which may be semicircular, having separate leads 67a and 68a. It is to be understood that in any crystal configuration disclosed herein several crystals may be replaced by a single crystal having several electrodes.

Figure 14:
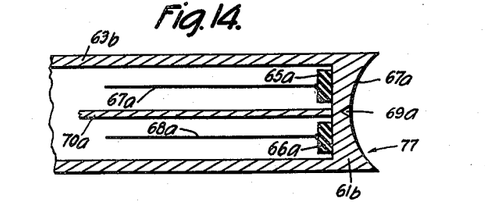
Fig. 14 is a partial sectional view of a dual transducer having focusing means.

Fig. 14 shows another dual transducer in which the housing 63b, crystals 65a and 66a, and leads 67a and 68a may be similar to those of Figs. 10 and 11. The crystals 65a and 66a are isolated or decoupled from each other by the groove 69a and electric shield 70a. The end wall 61b has a curved outer face 77. The face 77 is curved to focus the transmitted waves to a line or a point by making the face 77 cylindrical or spherical. It will be understood that if the material of the housing 63b has an index of refraction greater than that of the fluid, the wall 61b may require a convex rather than a concave curvature.

Figure 15:
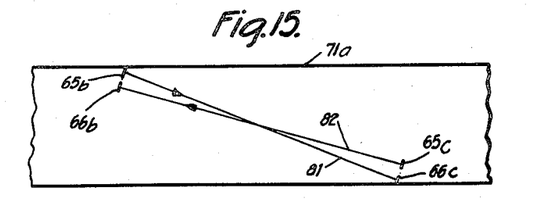
Figs. 15 and 16 relate to an arrangement for a pair of transducers of the type shown in Fig. 14.

A pair of transducer assemblies of the type shown in Fig. 14 are arranged in a pipe 71a to give a pair of very close crossed wave paths 81, 82, as shown in Fig. 15. The crystal positions of one transducer assembly are represented by lines 65b, 66b, and of the other transducer assembly by lines 65c and 66c. The radius of curvature of the lens surface 77 for the desired paths 81, 82 is determined by the fundamental laws of wave propagation, considering the wave velocities in the metal and liquid media, and the desired spacing between the transducer assemblies.

Figure 16:
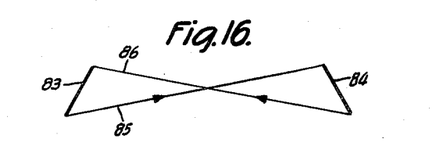

The arrangement shown in Fig. 15 has the further advantage that certain errors of non-parallelism do not upset the path length equality. This may be understood from Fig. 16, wherein the crystal seating surfaces 83 and 84 of the metal interfaces of a pair of transducer assemblies are shown as being non-parallel, yet the paths 85 and 86 have equal lengths.

Figure 17:
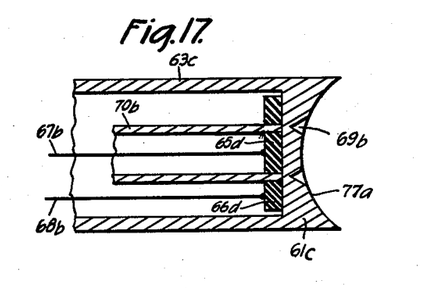
Figs. 17 and 18 are partial sectional views of still another embodiment of a dual transducer.
Figure 18:
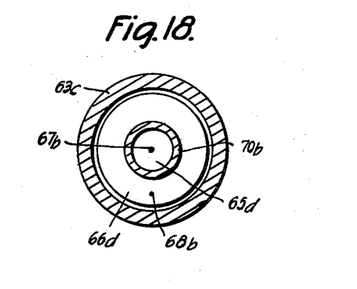

Figs. 17 and 18 show an alternative arrangement in which a small circular crystal 65d is within a ring-shaped crystal 66d, the two crystals being separated by a metallic shield 70b. The wall 61c has a lens surface 77a and is provided with a circular groove 69b located in the portion of wall 61c which is intermediate crystals 65d and 66d. In other respects housing 63c may be similar to those described previously. The crystals 65d and 66d are provided with input and output leads 67b and 68b.

Figure 19:
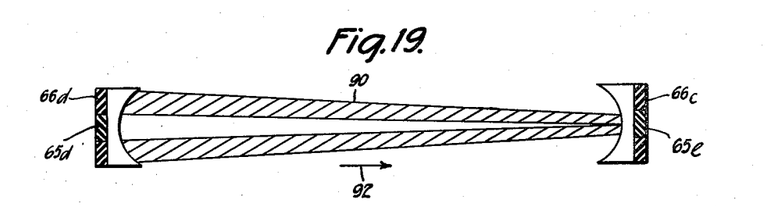
Figs. 19 and 20 illustrate the operation of the transducers shown in Figs. 17 and 18.
Figure 20:
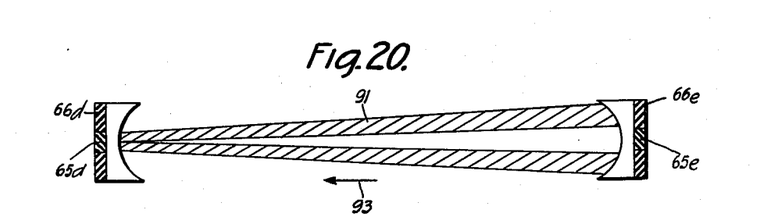

The operation of a pair of transducing devices of the type shown in Figs. 17 and 18 is schematically indicated in Figs. 19 and 20. In Fig. 19 the lens formed by wall 61c converges the waves produced by the transmitting crystal 66d into a beam 90 focused on the receiving crystal 65e of the opposite transducing device. Conversely the waves produced by the transmitting crystal 66e are converged into a beam 91 which is focused on the receiving crystal 65d. The beams 90 and 91 will be nearly superimposed on each other. It is evident then that the two beams, which travel in the directions indicated by arrows 92, 93, will occupy nearly the same paths through the fluid, and that they will have the same length by virtue of the fact that they extend between the same pair of transducing devices. A further advantage of these transducing devices is that the waves are concentrated into a high intensity beam at the receiving crystals. The resulting system, therefore, has an increased discrimination against unwanted reflections, and also requires less amplification for stable operation.

While I have shown and described my invention as applied to a particular flowmeter system and have given several illustrative examples of my invention, it is recognized that certain changes and modifications will be obvious to those skilled in the art, and therefore I aim to define the true spirit and scope of my invention in the appended claims.

I claim:

1. In a device for determining a velocity characteristic of a moving fluid; opposite spaced electroacoustic transducer transmitting means and receiving means in acoustic contact with the fluid, said transmitting means sending acoustic carrier waves upstream through the fluid to said receiving means, electrical circuit means connected between the receiving means and transmitting means; said circuit means including a generating means for producing packets of electrical carrier waves of a predetermined frequency and impressing said waves on the transmitting means and amplifying means connected between the receiving means and the generating means for impressing received packets of undetected carrier waves on said generating means, said generating means producing a carrier wave packet of a predetermined duration in response to a predetermined instantaneous voltage magnitude of the carrier waves impressed on said generating means, second electro-acoustic transducer transmitting means and receiving means opposite each other and spaced from each other in the fluid, said second transmitting means sending acoustic carrier waves downstream through the fluid to said second receiving means, second electrical circuit means interconnecting the second receiving means and second transmitting means, said second circuit means including generating means responsive to a predetermined instantaneous voltage magnitude of the received undetected carrier waves impressed thereon for producing packets of carrier frequency oscillations, and frequency measuring means connected to the first and second circuit means for measuring the difference between the recurrence frequencies of the wave packets in the first and second circuit means.

2. A device according to claim 1, including means connected to each generating means for triggering said generating means to cause it to produce a wave packet in the absence of received wave packets for a predetermined period which is greater than the period between wave packets.

3. A device according to claim 2, wherein each generating means includes a blocking oscillator.

4. A device according to claim 3, wherein said blocking oscillator includes a load circuit which is resonant at the carrier frequency and means for blocking the oscillator after a predetermined number of carrier frequency oscillations are generated and keeping it blocked for a sufficient period to prevent the oscillator from operating in spurious frequency modes.

5. A device according to claim 1 wherein said generating means is responsive to an instantaneous carrier wave voltage only of a given polarity.

6. A device according to claim 5, each feedback means including a cathode follower having an output circuit comprising an inductor and a diode rectifier connected in parallel, said output circuit being connected to the input of said generating means.

7. A device according to claim 1, wherein the transducer means include means for increasing the rate of rise of the amplitudes of the early cycles of a wave packet and thereafter stabilizing the amplitudes of subsequent cycles of the wave packet.

8. A device according to claim 7, wherein the transmitting means comprises a housing and a piezoelectric crystal mounted in said housing, the crystal having one major face fixed to and in abutment with one wall of the housing, said wall being positioned in contact with the fluid.

9. A device according to claim 8, wherein the thickness of said one wall of the housing is greater than the length of half the number of wavelengths of a wave packet.

10. A device according to claim 9, wherein a material is mounted on the external side of said wall having an acoustic impedance intermediate that of said housing and that of the fluid.

11. A device according to claim 8, wherein said wall has a thickness substantially equal to an integral number of half wavelengths.

12. A device according to claim 8, wherein said wall has a thickness substantially equal to an odd integral number of quarter wavelengths.

13. A device according to claim 8, wherein said housing is a metallic cylinder, the crystal being mounted on the base of the cylinder.

14. A device according to claim 8, wherein a material is mounted on the external side of said wall having an acoustic impedance intermediate that of said housing and that of the fluid.

15. A device according to claim 8, wherein a material is mounted on the external side of said wall having arbitrary acoustic impedance wherein the thickness of said material is substantially equal to an integral number of half wavelengths of the carrier wave in said material, said integral number being less than half the total number of waves in a wave packet.

16. A device according to claim 1, including means for comparing the amplitude of the waves at the output of said amplifying means with a reference potential, and means responsive to said comparing means for controlling the gain of the amplifying means.

17. A flowmeter comprising a first acoustic wave transmitting and receiving means and a second acoustic wave transmitting and receiving means located in a moving wave propagating medium for transmitting waves to and receiving waves from each other in upstream and downstream directions, each of said means comprising a housing having a wall facing the like wall of the other means, a piezoelectric transmitting transducer and receiving transducer mounted on said wall inside said housing, a feedback means connected between the receiving transducer in each housing and the transmitting transducer in the other housing for impressing electrical oscillations on said transmitting transducer in response to acoustic waves received by said receiving transducer, whereby the waves travel through the wave propagating medium along nearly coincident paths and frequency measuring means connected to both feedback means.

18. A flowmeter according to claim 17 wherein the two transducers comprise a single piezoelectric slab in acoustic contact with the inside face of said wall and a pair of electrodes on one face of said slab.

19. A flowmeter according to claim 17 wherein each of said transmitting and receiving means includes means for focusing the waves transmitted thereby on said wall of the other transmitting and receiving means.

20. A flowmeter according to claim 18 wherein the external face of said wall of each housing is spherically concave.

21. A flowmeter according to claim 18 wherein the external face of said wall of each housing is cylindrically concave.

22. A flowmeter according to claim 17 wherein said wall has a thickness substantially equal to an integral number of half wavelengths of said waves in said wall.

23. A flowmeter according to claim 17, including a material on the external face of said wall having an acoustic impedance intermediate that of said wall and that of the medium through which the waves are propagated between the first and second transmitting and receiving means.

24. In a device for determining a velocity characteristic of a fluid stream, a transducer arrangement comprising a first transducer means and a second transducer means located contiguously to the fluid for transmitting waves to and receiving waves from each other, in upstream and downstream directions each of said transducer means comprising a housing having a wall facing the like wall of the other transducer means, a pair of piezoelectric crystals on said wall inside said housing, an input lead connected to a first of said pair of crystals and an output lead connected to the second of said pair of crystals; feedback means connected between each output lead and the input lead of the other transducer means, said feedback means including a generating means for producing packets of carrier waves and impressing said waves on its respective input lead, amplifying means connected between the output lead and the generating means for impressing received packets of carrier waves on said generating means, means for comparing the amplitude of the waves at the output of said amplifying means with a reference potential and for controlling the gain of said amplifying means in response to said comparison, said generating means including triggering means for initiating the production of a wave packet of a predetermined duration in response to a predetermined instantaneous voltage magnitude of the carrier waves impressed on said generating means; mixer means connected to both of said feedback means for deriving the algebraic sum of the repetition frequencies of the wave packets in the two feedback means and a frequency meter connected to said mixer means for determining the value of said algebraic sum.

References Cited in the file of this patent

UNITED STATES PATENTS

| 2,384,465 | Harrison | Sept. 11, 1945 |
| 2,477,246 | Gillespie | July 26, 1949 |
| 2,480,535 | Alois et al. | Aug. 30, 1949 |
| 2,645,727 | Willard | July 14, 1953 |
| 2,657,319 | Smack | Oct. 27, 1953 |
| 2,669,121 | Garman et al. | Feb. 16, 1954 |
| 2,708,366 | Blocher et al. | May 17, 1955 |
| 2,748,369 | Smyth | May 29, 1956 |

FOREIGN PATENTS

| 352,040 | Great Britain | June 29, 1931 |
| 603,644 | Great Britain | June 21, 1948 |
| 616,794 | Great Britain | Jan. 27, 1949 |
| 623,022 | Great Britain | May 11, 1949 |
| 881,644 | France | Jan. 28, 1943 |